United States Patent
Hatcher, Sr.

[15] 3,683,973
[45] Aug. 15, 1972

[54] ROTOR SYSTEM AND METHOD FOR MANIPULATING LIQUID MATTER

[72] Inventor: Donald W. Hatcher, Sr., Route 4, Box 207, Clinton, Tenn. 37716

[22] Filed: Oct. 13, 1970

[21] Appl. No.: 80,347

[52] U.S. Cl. ....................141/1, 141/34, 141/115, 141/283
[51] Int. Cl. ....................B65b 1/04, B65b 3/04
[58] Field of Search....................141/1, 34, 115–127, 141/283, 129

[56] References Cited

UNITED STATES PATENTS 3,175,732  3/1965  Unger..........................141/34

*Primary Examiner*—Houston S. Bell, Jr.
*Attorney*—Anderson, Luedeka, Fitch, Even & Tabin

[57] ABSTRACT

A rotor system including a rotor having a plurality of cavities disposed radially and in concentric array about the rotational axis of the rotor for receiving and retaining respective quantities of liquid, each cavity having an overflow through which liquid in excess of the volumetric capacity of the cavity is expelled upon rotation of the rotor, and displacement means of known displacement volume movable into each cavity upon rotation of the rotor whereby a known quantity of liquid is displaced from each cavity and expelled from the rotor into appropriate receptacles. The method disclosed includes the step of admitting gross quantities of liquid to the rotor cavities initially and expelling the liquid in excess of the cavity volume by rotating the rotor. Subsequently, in accordance with the disclosed method, the rotor is rotated with a displacement body in each cavity to expel a further, but known, quantity of liquid from each cavity.

8 Claims, 9 Drawing Figures

Patented Aug. 15, 1972

INVENTOR
Donald W. Hatcher Sr.

Anderson, Luedeka, Fitch, Even, & Tabin
ATTYS.

Patented Aug. 15, 1972

INVENTOR
Donald W. Hatcher Sr.

Anderson, Luedeka, Fitch, Even & Tabin
ATTYS.

INVENTOR
Donald W. Hatcher Sr.

Anderson, Luedeka, Fitch, Even & Tabin
ATTYS.

ROTOR SYSTEM AND METHOD FOR MANIPULATING LIQUID MATTER

This invention relates to rotor systems and particularly to methods and apparatus for manipulating liquids employing a rotor system.

There exist several commercially available centrifuge systems which are primarily useful for rapidly and accurately carrying out various analytical procedures, including medical diagnostic procedures. Generally, as carried out in a centrifugation system, these procedures involve the introduction of two or more measured quantities of liquid (a specimen plus one or more reagents) into receptacles, termed "cuvettes", where a chemical reaction takes place. In the usual centrifugation system, a plurality of cuvettes, 16 for example, are positioned around the periphery of a central rotor having a corresponding number of cavities. A first quantity of a sample, human blood for example, is measured into each of a first set of separate cavities of the rotor. A second set of cavities in the rotor are provided with a reagent, for example. The blood and reagent are spun from the two sets of cavities (16 cavities per set) in the rotor into the 16 corresponding cuvettes simultaneously. Identical reactions occur in the 16 revolving cuvettes. The progress of the reactions in the several cuvettes may be observed by known means, such as by monitoring the transmission of a light beam passing through the cuvettes (which are transparent themselves) as they are rotated through the beam.

Heretofore it has been common practice to introduce a measured quantity of sample or reagent into each of the individual cavities in the rotor by pipetting or like technique. In addition to the known inaccuracy of pipetting operations, their time consuming nature has limited the usefulness of centrifugation in diagnostic procedures and other analyses by so increasing the time required to complete a full procedure that the advantages of centrifugation are lost or overshadowed by the time element.

It is an object of the invention disclosed herein to provide an improved rotor system. It is also an object to provide a method and apparatus for manipulating a liquid employing a rotor system. It is also an object to provide an inexpensive rotor system whose components are designed to be of the single-use type.

Other objects and advantages of the invention will be recognized from the following description, including the drawings. In the drawings.

Figure 1:
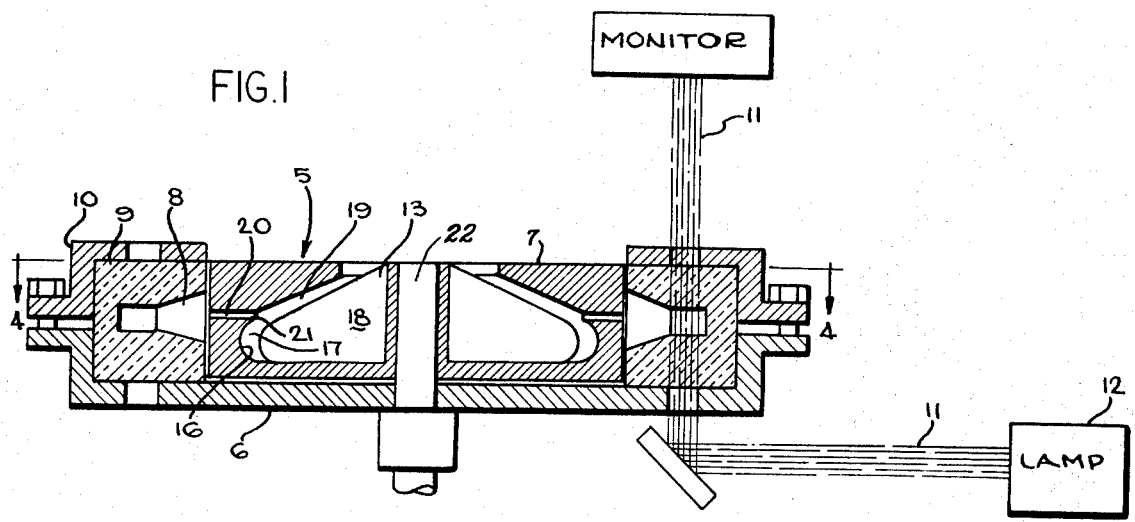
FIG. 1 is a representation of apparatus for observing the status of liquids in a centrifuge and depicting various features of the present invention.

In accordance with the method disclosed herein, a preselected quantity of liquid matter, sample or reagent for example, is admitted to one or more central holding chambers in a centrifuge rotor. Each chamber is provided with a radially outward cavity portion which is in fluid communication with the respective central chambers. Each cavity is provided with an overflow including a weir and is adapted to receive and retain a quantity of liquid matter when the rotor is rotated at a speed such as displaces the liquid radially outward. After loading of the liquid into the holding chambers, the rotor is rotated whereupon the liquid moves outwardly from the chambers proper into the several cavities. Further, any liquid in excess of the capacity of the respective radially outward cavities at the instant rotational speed of the rotor is caused to overflow the respective weirs and be expelled through the overflows. Thereupon the rotor is brought to its rest position and appropriate cuvettes are positioned adjacent the respective overflows of the cavities. To each of the radially outward cavities there is introduced a body having a displacement volume substantially equal to the volume of the preselected quantity of liquid which it is desired to dispense into each of the cuvettes. Upon subsequent rotation of the rotor whose respective cavities are each loaded with liquid and a displacement body, and with the cuvettes in position at the respective overflows of the cavities, the displaced quantities of liquid overflow the respective weirs, are expelled through the overflows and collected in the respective cuvettes. Several diverse liquids may be dispensed into the cuvettes successively or simultaneously as will appear more fully hereinafter.

Apparatus for carrying out the disclosed method is described herein and preferably includes a demountable rotor for purposes which will appear hereinafter. Apparatus for introduction of the several displacement bodies into the respective cavities of the rotor also will be described.

To facilitate an understanding of the method of the disclosed invention, apparatus for carrying out the method will be discussed. The basic centrifugation system employed in the disclosed method is depicted diagrammatically in FIG. 1 and need only be referred to in general terms since suitable systems are available from commercial sources and well-known in the art. Generally this system comprises a centrifuge 5 including a housing 6, normally circular in geometry, rotatably mounted by suitable means (not shown) and providing support for a central rotor 7 and a plurality of cuvettes 8 disposed in the peripheral region of the housing. Both the rotor and cuvettes usually are rotatable with the housing. The cuvettes usually comprise openings cut in the inner wall of a transparent ring 9, this ring being mounted in the housing and held in place by an annular clamp 10. A light beam 11 from a lamp 12 may be directed through the cuvettes as they spin through the beam. The transmission of the beam through a cuvette (when a sample is in the cuvette) may be monitored and/or recorded as a measure of the state or quality of the matter contained in the cuvette.

Figure 2:
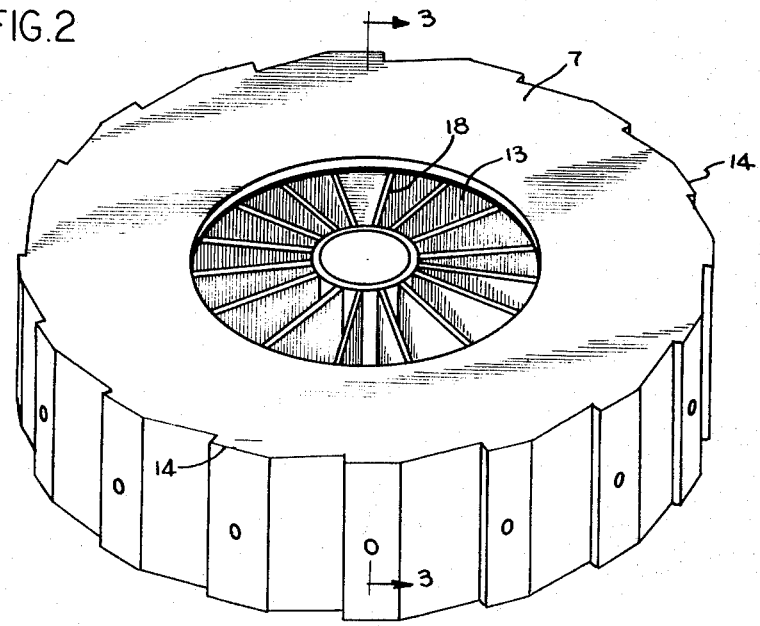
FIGS. 2, 2A and 2B are a representation of a rotor constructed in accordance with the present invention and including various construction details of the rotor and a collector ring within which the rotor is fitted.
Figure 2B:
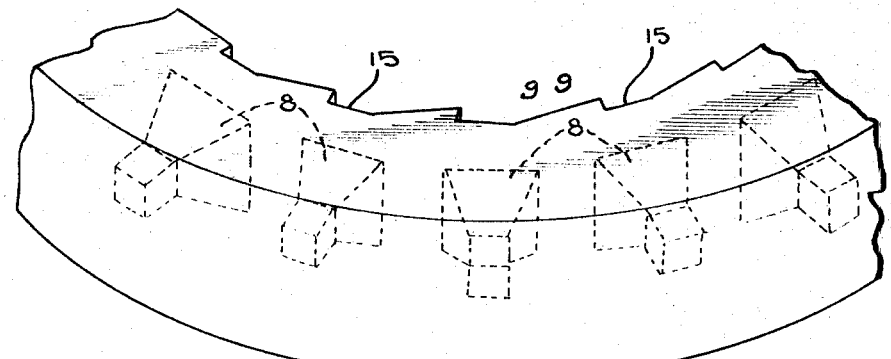

Referring to FIG. 2, the present invention includes a rotor 7, preferably of circular configuration. The periphery of the rotor may be provided with toothed portions 14 adapted to engage respective slot portions 15 of an annular collector ring 9 thereby providing a connection between the rotor and ring 9. This ring 9 preferably is rotatably held within a housing 6 (see FIG. 1) thereby providing rotatable mounting of the rotor within the centrifugation system.

The rotor 7 preferably is divided centrally into a plurality of chambers 13 of generally equal volumes. Each of these chambers 13 preferably diverges radially outward to contact a curved, but generally vertical, wall 16 thus defining a cavity 17 at the most radially outward portion of each chamber 13. The several chambers 13 are separated by partitions 18 which define the lateral extremities of the chamber 13 and the cavities 17. Each cavity 17 is provided with an overflow 20 whose radially inward opening defines a weir 21 over which liquid matter will flow upon rotation of the rotor as will be discussed hereinafter. Preferably each chamber is partly covered in the region of its respective cavity portion by a top wall portion 19 which slopes downwardly toward cavity 17 so that upon rotation of the rotor any liquid droplets or the like present on the top wall portion will be forced into the cavity 17 or caused to exit the chamber through overflow 20 under the influence of the centrifugal forces developed by the rotating rotor. It is noted that in a preferred embodiment, the radially outward termination of each overflow 20 is disposed on one of the toothed projections 14 on the periphery of the rotor. As shown in FIG. 2, when the toothed projection 14 of the rotor is disposed within its corresponding indention 15 in the collector ring 9, the terminus of the overflow 20 is disposed centrally of a cuvette 8 in the collector ring and there is no opportunity for misalignment between an overflow and its corresponding cuvette.

Preferably the rotor 7 may be provided with a central hollow post 22 for receiving a displacement body dispersing unit as will appear more fully hereinafter. Alternatively, the several partitions 18 defining the chambers 13 may converge to a central axis without including a central post.

Figure 2A:
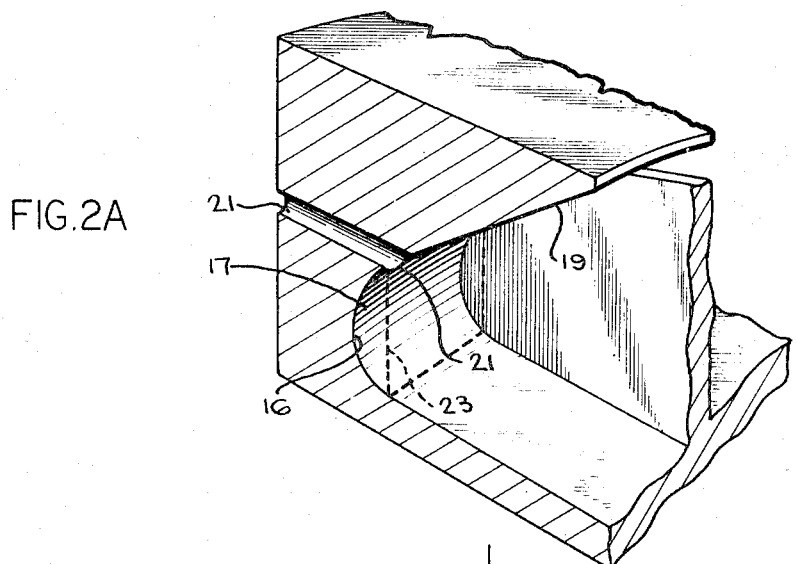
Figure 3:
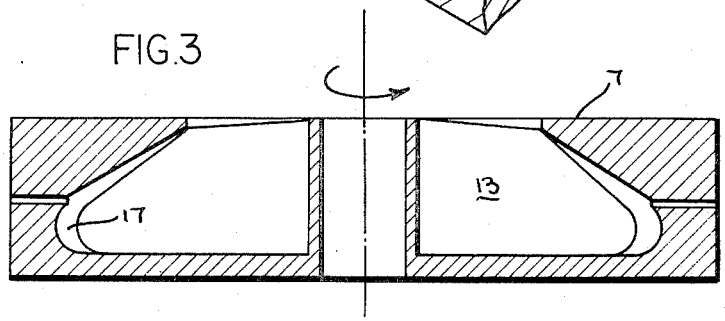
FIG. 3 is a cross-sectional view of the rotor of FIG. 2 taken along the line 3—3 of FIG. 2.

FIG. 3 depicts the rotor 7 in cross section, the view of FIG. 3 being taken along the line 3—3 of FIG. 2. In this cross-sectional view, it may be seen that upon rotation of the rotor 7 about its central axis any liquid contained in a chamber 13 will be subjected to the influence of centrifugal forces developed by the rotating rotor. The liquid will be caused to flow radially outward and collect in the cavity 17. Depending upon the rotational speed of the rotor and the physical characteristics of the liquid in the chamber, liquid in excess of the volumetric capacity of the cavity will overflow weir 21 and be expelled from the chamber through overflow 20. During such rotation of the rotor, any liquid splattered on the top wall 19 in the form of droplets or the like will be forced radially outward and either expelled through the overflow 21 or moved into the cavity. Consequently, under the centrifugal forces developed at a given rotational speed of the rotor, the several cavities of the rotor can be caused to contain identical quantities of liquid, assuming each chamber 13 was provided initially with a quantity of liquid at least equal to or in excess of the volumetric capacity of each cavity and the several cavities are of identical volumetric capacity. It is not required, however, that the several cavities be of identical volumetric capacity for as will be discussed, it is the displaced liquid which is of a measured volume. In any event, because of its respective geometric configuration, each of the cavities will retain a selected volume of liquid regardless of the rotational speed of the rotor so long as such rotational speed is at least equal to or in excess of the rotational speed which will cause the liquid in the respective chambers to be displaced into the cavities and held against the curved wall 16 of each cavity. Preferably the rotor is rotated sufficiently fast to cause the radially inward surface of the liquid in each of the cavities to define a substantially vertical wall such as shown by the dotted line 23 of FIG. 2A.

Figure 4:
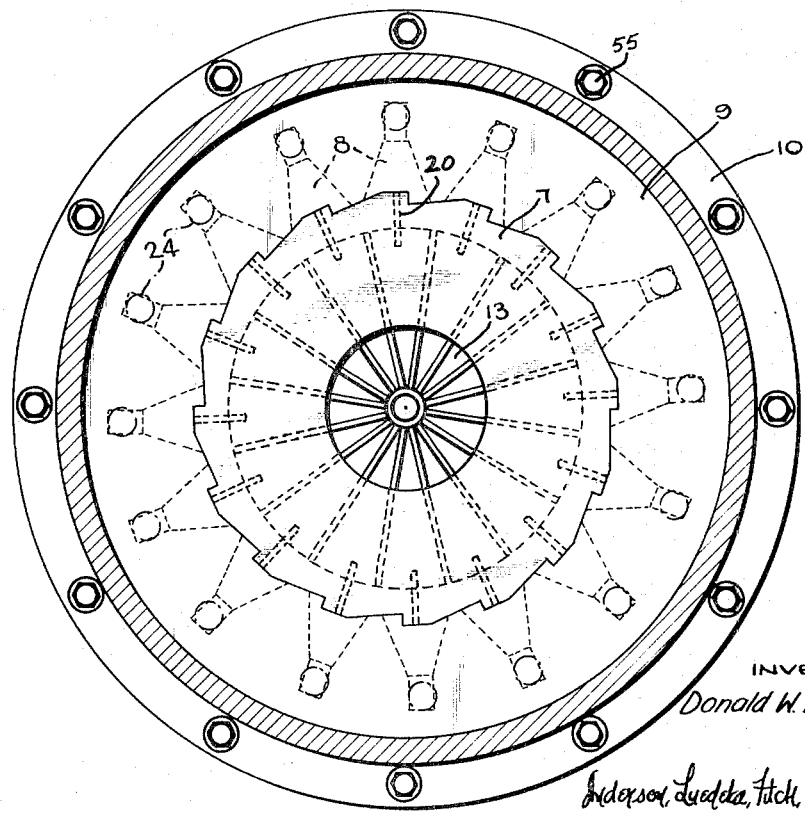
FIG. 4 is a plan view of a rotor system depicting various features of the present invention.

FIG. 4, a generally plan view taken along the line 4—4 of FIG. 1, depicts the rotor 7 disposed within its encompassing collector ring 9 which in turn is secured to the centrifuge housing by means of a clamp ring 10 bolted to the housing by bolts 55. In this view, it may be seen that liquid introduced to the central chambers 13 will be caused to flow radially outward into the cavities 17 upon rotation of the rotor as the centrifuge housing is rotated. Any fluid in excess of the volumetric capacity of each of the respective cavities will overflow the cavity and pass through the overflow 20 into the cuvette 8 disposed radially outwardly from the overflow 20. That liquid flowing through the overflow into the cuvette is collected in the most radially outward tip of the cuvette which, by design, is disposed in register with appropriate openings 24 in the centrifuge housing so that a light beam may be passed through the cuvettes for monitoring purposes.

In conducting one kind of analysis employing the present invention, a rotor is initially loaded with a quantity of specimen, for example human blood, at a station remote from the centrifugation system depicted in FIGURES. At such station (which is not depicted in the FIGURES), a quantity of blood is admitted to each of the individual chambers 13. This quantity of blood need not be measured exactly and the primary requirement is that the quantity admitted to each chamber be in excess of the volumetric capacity of the respective cavity of each chamber. It thus becomes evident that the absence of a requirement of accuracy in measuring the quantity of blood admitted to each chamber reduces the time required for an operator to introduce the blood specimen to each chamber. After each chamber has been provided with its respective quantity of blood (it is not necessary that each chamber have the same quantity, rather it is anticipated that no two chambers will have the same quantity of blood unless by coincidence the operator happens to pour identical amounts into several chambers), the rotor, while still at the remote station, is rotated to displace the blood radially outward into the several cavities and eject from the rotor all quantities of blood in excess of the respective volumetric capacities of the cavities at the chosen rotational speed of the rotor.

Having been rotated to eject excess specimen from the respective cavities, the rotor is brought to rest. The blood within the respective cavities, of course, recedes from the cavity and disperses itself within the respective chambers. However, it will be recognized that none of the blood can escape from the chambers and upon rotation of the rotor at a subsequent time, the blood will merely recollect within the respective cavities.

After the rotor has been brought to rest, a displacement body is admitted to each of the chambers 13. This displacement body may take the form of a solid sphere or other appropriate body which is capable of displacing a quantity of liquid when immersed in the liquid and which is inert in the presence of the liquid to be displaced. The displacement volume of the body must be known or capable of being calculated and in the preferred operation, all of the displacement bodies have identical displacement volumes. One desirable displacement body is a spherical glass bead, these beads being preferred because of their inertness, and the ease with which their displacement volume can be determined. Also, such beads are readily obtainable at a reasonable cost.

Figure 5:
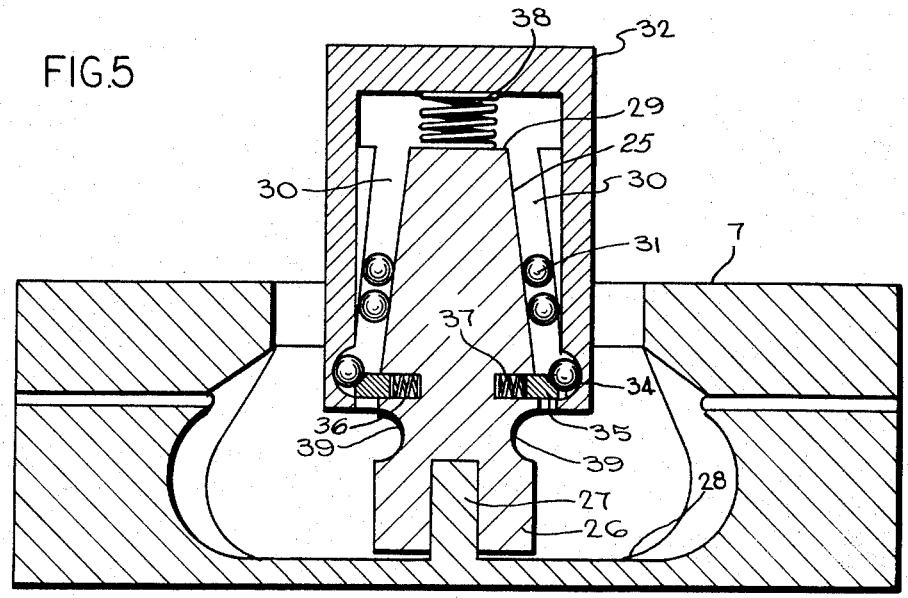
FIG. 5 is a cross-sectional view of a rotor system including means for dispensing displacement bodies into several cavities of the rotor.

The displacement bodies, hereinafter referred to as "beads" for convenience, may be admitted to the rotor chambers while the rotor is at rest as noted above or the centrifugal forces accompanying rotor rotation may be used to assist in introducing the beads into the chambers. One embodiment of apparatus for dispensing the beads is depicted in FIG. 5. This apparatus includes a central post 25 having its lower end 26 centrally bored to receive a lug 27 upstanding centrally from the bottom 28 of the rotor 7. The top portion of the post 25, indicated generally by the numeral 29, is provided with a plurality of channels 30 serving as storage channels for a plurality of beads 31 residing therein. The bottom of each respective channel 30 is open for permitting the dispensing of beads from each channel. The top portion 29 of the post 25 is covered by a cap 32 slidably disposed over the post. The open end of the cap depends downwardly over the top portion 29 of the post to cover the several openings of the channels 30. The inner wall of the cap is cavitated at each point where the cap covers a channel opening. The cavity 34 provided in the inner wall of the cap at each such channel opening is partially closed by a wedge 35 slidably mounted in an opening 37 in post 25 and spring-biased outwardly to cooperate with cavity 34 to maintain a single sphere within the cavity at any one time as indicated in FIG. 5. Cap 32 is biased in the upward direction by a spring 38 so as to maintain the lower rim of the cap 32 urged in a closed position adjacent the wedge 35 thereby preventing dispensing of beads from the several channels 30. However, when the cap 32 is pressed downwardly against the force of spring 38, the wall of cavity 34 urges the bead which is captured in the cavity against the wedge surface of the wedge 35 forcing it to slide inwardly and permit the bead to pass by the wedge. As the bead passes by the wedge 35, the spring 36 forces the wedge radially outward toward the cap 32 thereby preventing release of more than one bead per each downward movement of the cap 32. The bead within the cavity 34 which bypasses the wedge 35, enters a further cavity 39 provided in the post 25. This further cavity 39 is of a sufficiently large volume so that as the bead passes from cavity 34 into cavity 39, the bead is allowed to escape from between the cap and the post and enter the rotor chamber directly beneath the opening.

Figure 6:
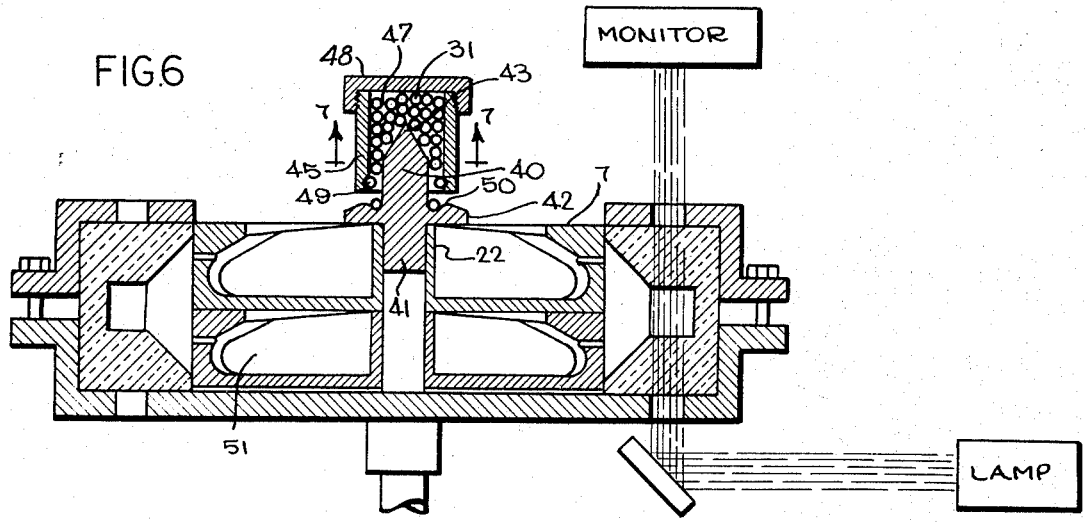
FIG. 6 is a representation of a rotor system including a plurality of rotors and also including means for dispensing displacement bodies into the several cavities of one of the rotors by means of centrifugal forces.
Figure 7:
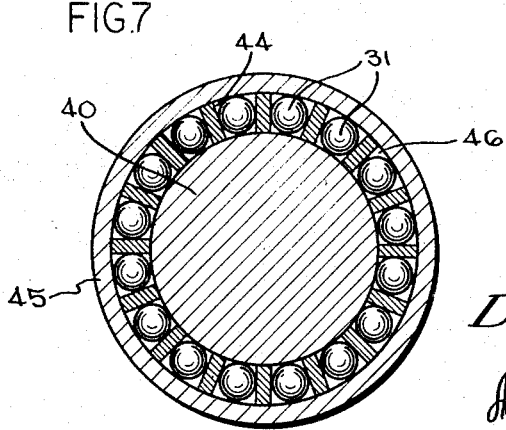
FIG. 7 is a cross-sectional view of the displacement body dispensing means shown in FIG. 6 and taken along the line 7—7 of FIG. 6.

A further apparatus for dispensing beads into the several chambers of the rotor is depicted in FIG. 6. This further apparatus comprises a central post 40 having a lowermost portion 41 received in the hollow central post 22 of the rotor 7. This post 40 has an annular flange 42 which rests against the top of rotor 7 thereby supporting the post 40 above the rotor 7. Preferably the engagement between the rotor and post is such as will lock the post in rotational engagement with the rotor. A cross-sectional view of this dispensing device is depicted in FIG. 7, the view of FIG. 7 being taken along the line 7—7 of FIG. 6. The uppermost portion 43 of the post 40 is joined by a plurality of partitions 44 to an encapsulating annular sleeve 45 so as to define a plurality of bead-receiving channels 46. The annular sleeve preferably extends vertically higher than the top portion of the post 40 to define a storage chamber 47 for a plurality of beads. The top portion 43 of the post 40 is preferably tapered and extends upwardly into the storage cavity 47 so that the beads are readily directed into the several channels 46 for dispensing into the chambers of the rotor. As desired a cap 48 may be provided for closing the top of the storage chamber 47.

The inner wall of the sleeve 45, at its lower rim, is provided with a cavity 49 adjacent the lower portion of each of the channels 46. This cavity 49 may be in the form of an annular groove extending around the inner wall of the sleeve 45, but in any event, the lower wall of the cavity slopes upwardly for purposes which will appear in further discussion. The lower end of the sleeve 45 terminates above the shoulder 42 by a distance sufficient to permit the passage therebetween of a single bead. The annular shoulder 42 is provided with an annular ridge 50 on the upper surface of the shoulder 42. This ridge upstands to provide an obstruction against the passage of the bead radially outward from the post 40. No obstruction is provided at the lower end of each of the channels 46 so that at all times when the rotor is at rest there will be a single bead from each channel resting on the upper surface of the shoulder 42 and radially inward from the annular ridge 50. The several beads on the shoulder may be separated laterally by partitions on the shoulder (not shown) or by extensions of the partitions 44. Upon commencement of rotation of the rotor 7, the centrifugal forces against the beads will cause those beads residing on the annular shoulder 42 to be forced over the ridge 50 to fall into the respective chambers immediately beneath each of the channels. At the same time the centrifugal forces acting upon that bead which is next in line for dispensing, will force such bead radially outward and into contact with the upwardly sloping wall of the cavity 49 thereby preventing the bead from falling out of its channel and at the same time blocking the passage of successive beads into position on the shoulder 42 for dispensing. Once the rotor has again been brought to rest, the centrifugal forces are relieved and this next bead falls into position for dispensing when the rotor is again rotated.

As stated hereinbefore, when the rotor is rotated, the beads and the liquid within the respective chambers are displaced into the respective cavities and that volume of liquid displaced by the bead in each cavity is caused to overflow the cavity and be expelled from the rotor into the corresponding cuvette disposed in juxtaposition to the overflow. By this means there is dispensed from each cavity a known quantity of liquid into each of the cuvettes.

The foregoing described apparatus and procedure for introducing a selected quantity of specimen into each of the cuvettes may be repeated as many times as desired for purposes of successively introducing reagents or additional material to the respective cuvettes to obtain the desired reaction. The present invention provides much freedom in the selection of the number of reagents and/or the time at which a reagent may be introduced to the cuvette. For example, after a reaction has been commenced with a first reagent, a further reagent may be added as may be desired in a particular analysis.

A further feature of the present invention includes the concept of simultaneously introducing a plurality of liquids to a cuvette. This concept is generally depicted in the apparatus of FIG. 6 which includes a plurality of rotors of the kind described hereinbefore stacked one on top of the other within the centrifugation system housing. In accordance with this feature of the invention, the first rotor 51 may be loaded with a specimen, human blood for example, at a remote station as described hereinbefore and an appropriate bead placed within each of the chambers of the rotor. This "loaded" rotor is first placed in the centrifuge housing. A second rotor 7 is likewise loaded at a remote station. This second rotor may contain the reagent which it is desired be reacted with the specimen. As desired, the second rotor may be provided with a bead within each of its chambers at the remote station and before the rotor is introduced into the centrifugation system or, alternatively, the beads may be added to the chambers of this second rotor 7 by any of the means herebefore described. With these two rotors in position in the centrifugation system, the apparatus is rotated. Thereupon, the liquid within each of the several cavities is displaced by the beads within the cavities and is caused to overflow the cavities, be expelled from the rotor, and received in the corresponding cuvettes. It is noted that the liquids from the two rotors are discharged simultaneously into the respective cuvettes where they become mixed and react. The capability provided by the present invention to simultaneously introduce measured quantities of two or more liquids into the cuvette enhances the usefulness of the centrifugation system concept in that it is possible by means of the present invention to observe the progress of reactions which require the simultaneous combination of two or more liquids if the reaction is to occur.

The present method and apparatus make possible the preparation of specimens and reagents at stations remote from the centrifugation apparatus. This capability not only frees the centrifugation apparatus for use in conducting analyses as distinguished from its being tied up during pipetting procedures or the like but it also makes possible the preparation of specimens and reagents with a savings of time. The remote station referred to herein may comprise a centrifuge of uncomplicated construction such as a rotated holder for the rotor with an overflow catch basin as will be apparent to one skilled in the art. The cavities provided in the rotor disclosed herein permit rapid and accurate loading of the rotor chambers without tedious attention to the introduction of accurately measured quantities of liquid to each chamber. The present invention allows the operator or technician to pour relatively gross quantities of liquid into each chamber and then merely spin the rotor to expel any liquid in excess of the volumetric capacity of the cavity associated with each chamber. Rotors as disclosed herein may be manufactured readily and inexpensively by known means and using inexpensive materials such as by injection molding of plastic. Thus rotors having differently-sized cavities may be economically provided as desired for various analyses and in most instances will be disposable items.

In addition, it is possible with the present apparatus and method to prepare a rotor loaded with reagent and a displacing bead within each of its chambers and store this rotor under appropriate conditions, for example by freezing, until the reagent is needed for use in conducting an analysis. The same capability is provided concerning the preparation of specimens. For example, blood specimens may be taken from a patient and immediately loaded into the rotor along with a bead in each of the chambers of the rotor and then frozen for subsequent analysis.

While preferred embodiments have been shown and described, it will be understood that there is no intent to limit the disclosure, but rather, it is intended to cover all modifications and alternate constructions falling within the spirit and scope of the invention as defined in the appended claims.

What is claimed is:
1. A rotor system comprising
   a rotor having a rotational axis,
   a plurality of radial cavities in said rotor disposed in generally concentric array about said rotational axis of said rotor for receiving and retaining respective quantities of liquid when said rotor is rotated,
   overflow means associated with each of said cavities and adapted to discharge from said cavity any liquid in excess of the volumetric capacity of said cavity at the instant rotational speed of said rotor, and
   displacement means disposed in each of said cavities, said displacement means in each cavity displacing a quantity of liquid within each of said cavities, said quantity of displaced liquid in each cavity being essentially equal to the liquid displacement volume of the displacement means in respective cavities, whereby said displaced quantities of liquid are expelled from respective cavities through their respective overflows upon rotation of said rotor with said displacement means in said cavities.

2. The rotor system of claim 1 and including dispensing means disposed in superposition to said rotor and including a plurality of displacement bodies for simultaneous admission to said cavities in said rotor.

3. The rotor system of claim 1 wherein said displacement means comprises a solid body of generally spherical geometry.

4. The rotor system of claim 1 wherein said solid body comprises a glass bead.

5. A dispenser device for simultaneously dispensing a plurality of displacement bodies into separate compartments of a rotor comprising mounting means releasably mounting said dispenser device in rotational engagement with said rotor in the approximate center of said rotor and above said compartments, a plurality of channel means in said device, respective ones of said channels being in alignment with and disposed above respective ones of said compartments when said dispenser device is mounted on said rotor, each of said channels being open at its lower end, at least one generally spherical displacement body disposed in each of said channel means, detention means retaining said displacement bodies within said channels and adapted to selectively and simultaneously release one body from each channel whereby said bodies are free to fall into said compartments.

6. The dispenser device of claim 5 wherein said detention means comprises an annular member having an inner wall disposed adjacent to said lower openings of said channels and spaced apart therefrom by a distance greater than the diameter of a displacement body but less than twice the diameter of a displacement body, a cavity in said inner wall of said annular member adjacent each of said lower openings of said channels, said cavity being of a depth such that a displacement body residing in said cavity projects into its respective channel a distance sufficient to preclude the passing of another displacement body therepast, said cavity including an upwardly inclined wall portion defining its lower dimension whereby when said dispenser is rotated the centrifugal forces accompanying such rotation forces a displacement body from each channel into said cavity to preclude the release of displacement bodies from said channels but when said dispenser is not rotating said bodies are released for movement out of said channels, retainer means disposed beneath said channels and spaced therefrom by a distance sufficient to permit the passage of not more than one displacement body therebetween, ridge means disposed on the upper side of said retainer means and defining a barrier against radial movement of displacement bodies except when said dispenser means is rotated at a rotational speed sufficient to cause said bodies to overcome said barrier.

7. A method for manipulating liquid matter employing a rotor system comprising the steps of:
admitting a quantity of said liquid matter to each of a plurality of holding chambers in said rotor, each of said chambers having at least one radially outward cavity portion adapted to receive and retain a quantity of said liquid when said centrifuge is rotated at a speed sufficient to displace said liquid radially outwardly, each of said cavities having an overflow including a weir, rotating said rotor with said liquid in said chambers whereby any liquid in excess of the capacity of said cavity portions of said chambers at the instant rotational speed of said rotor overflows said weir and is expelled from each cavity through its overflow, admitting to each of said chambers a body having a known displacement volume whereby upon subsequent rotation of said rotor there is displaced in each cavity a quantity of liquid substantially equal to the displacement volume of said body and said displaced liquid in each cavity overflows the respective weir of each cavity and is expelled from said rotor, and collecting said overflowing displaced liquid in collecting means disposed in juxtaposition to said overflows.

8. A method for manipulating a liquid employing a rotor system including a plurality of liquid receptacles the improvement comprising the steps of:
providing a multi-chamber rotor having a plurality of radially disposed cavities, each of said cavities having an overflow through which any quantity of liquid in said cavity that is in excess of the volumetric capacity of said cavity is discharged upon rotation of said rotor, introducing a gross quantity of liquid to each of said rotor chambers, rotating said rotor to force said liquid into said cavities and cause the discharge from the cavities of any liquid which is in excess of their respective volumetric capacities, admitting a displacement body of known liquid displacement volume to each of said cavities, introducing said rotor into means for rotating said rotor with each of said cavity overflow means being disposed in juxtaposition to a corresponding liquid receptacle, corresponding liquid rotating said rotor whereby said displacement bodies displace liquid in each cavity, said displaced liquid in each cavity being discharged from said cavity through its respective overflow means and collected in said respective receptacles.

* * * * *

UNITED STATES PATENT OFFICE
CERTIFICATE OF CORRECTION

Patent No. 3,683,973　　　　　　　　　　Dated August 15, 1972

Inventor(s) Donald W. Hatcher, Sr.

It is certified that error appears in the above-identified patent and that said Letters Patent are hereby corrected as shown below:

Column 10, line 44, delete "corresponding liquid".

Signed and sealed this 13th day of February 1973.

(SEAL)
Attest:

EDWARD M. FLETCHER, JR.　　　　　　ROBERT GOTTSCHALK
Attesting Officer　　　　　　　　　　Commissioner of Patents